METHOD OF REFINING SILICON
Filed Feb. 24, 1960
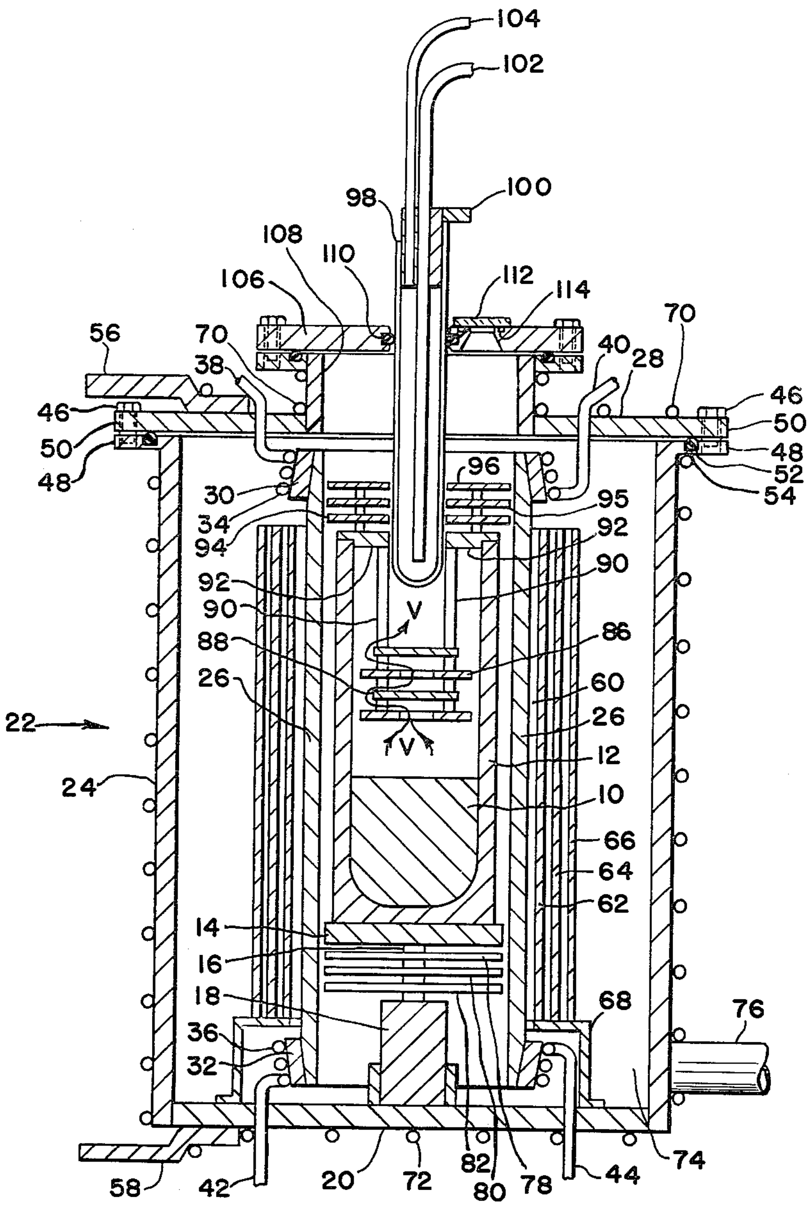
*INVENTORS.*
JOHN G. LEWIS
*BY* HAROLD A. OHLGREN
FINN G. OLSEN
ATTORNEY 3,090,678
METHOD OF REFINING SILICON John G. Lewis and Harold A. Ohlgren, Ann Arbor, Mich., assignors, by mesne assignments, to American Metal Products Company, Detroit, Mich., a corporation of Michigan Filed Feb. 24, 1960, Ser. No. 10,717
2 Claims. (Cl. 23—293)

This invention generally relates to a method for purifying silicon metal. More particularly, this invention pertains to a method for producing highly purified silicon by using vacuum distillation techniques. In one specific embodiment, this invention pertains to a method for producing silicon of 99%+ purity by fractional distillation under reduced pressure.

Silicon metal having a purity of approximately 97% is commercially available at a price of about $.25 to $.30 per pound. However, silicon metal having a purity of approximately 99% to 99.5% sells for about $18 per pound. Silicon of greater than 99.5% purity sells for as high as $150 to $300 per pound.

Silicon of greater than 99.5% purity is used for electronic purposes, especially in the manufacture of silicon transistors, silicon solar batteries and silicon rectifiers. Each of these classes of devices are of great current industrial interest and offer to provide very significant advantages over existing equipment. Silicon transistors operate at higher temperatures than germanium transistors and either of these devices offer significant advantages over conventional vacuum tubes for radio and electronic uses. The solar batteries offer possibilities of direct conversion of sunlight into electricity. Solar batteries are used presently to some extent; for example, in charging batteries in remote telephone relay stations, and in powering electronic equipment in some earth satellites.

Silicon rectifiers have the advantage of retaining their properties to high temperatures. These are competitive with germanium rectifiers in certain applications. Both silicon and germanium rectifiers are employed in converting alternating current into direct current for the purpose of welding machines and for electroplating tanks, chlorine cell rooms and other electrochemical applications.

The silicon or germanium rectifiers have lower voltage drops than do the mercury vapor arc rectifiers and, therefore, can be used in applications where the total output voltage is less than could be economically tolerated using a mercury arc rectifier.

In addition, these units are much more compact and promise to be less expensive and more maintenance-free than rotating equipment, such as synchronous convertors for changing alternating current into direct current.

Each of these classes of devices, if successfully developed, offer such great promise of revolutionizing their respective fields of endeavor that there appears to be a great and continuing need for silicon sufficiently pure to meet the requirements of these devices. High purity silicon is normally obtained either by specialized recrystallization methods or by employing inert atmosphere furnaces in order to purify a silicon which is especially made by the hydrogen reduction of the silicon tetrachloride. The requirement of making one's own silicon rather than buying commercial grades imposes a substantial investment upon the manufacturer who would make electronic-grade silicon. It is the purpose of this invention to permit a much readier manufacture of silicon of the required purity for electronic applications than conventional methods will allow.

A primary object is to produce a silicon of sufficient purity, probably with no more than one hundred parts per million of impurities, to serve as an electronic-grade silicon.

A further object is to produce electronic-grade silicon by starting with a cheap impure silicon raw material.

Another object of this invention is to convert impure 97.5% silicon to 99% to 99.5% silicon.

An additional object of this invention is to obtain purification of the less expensive grades of silicon into either 99.5% or electronic-grade silicon by the use of an inexpensive method of refining.

Still another object of this invention is to provide a means of converting 99.5% or thereabouts silicon to electronic-grade silicon having only a few parts per million impurities.

A further object of this invention is to provide a means of pre-purifying commercial silicon or the impure rejected silicon from these purification procedures to degrees of purity which would permit more economical operation of conventional methods of attaining electronic-grade purity in silicon, for example, by a zone-refining process.

These and other objects and advantages will become more apparent after reading the following description in conjunction with the drawing.

The one figure in the drawing is a vertical sectional view through a furnace structure which may be used for carrying out the distillation operation described herein.

The process of the present invention can probably be most readily understood by first considering the particular type of distillation apparatus for refining impure silicon metal which is shown in the drawing.

Impure silicon 10 is placed within a treated graphite crucible 12. The graphite crucible 12 is preferably treated with a diffusion-resistant barrier material, since the graphite alone would be soaked through and attacked by the heated silicon. Titanium carbide is an example of a material which would make the graphite a diffusion resistant barrier and we have successfully contained silicon in a graphite crucible which had been heavily coated with titanium carbide by diffusing from about 30 to 40 weight percent of the graphite crucible with titanium carbide. Light coatings of titanium carbide are not very effective in resisting the soaking and fracturing action of molten silicon upon graphite. A number of other protective coatings would also be suitable for this same purpose, such as tantalum carbide. Tantalum carbide would be a desirable protective material because the tantalum which might be dissolved into the molten silicon could be removed by later fractional crystallization more readily than many other materials. Tantalum also has the property of being partitioned readily from the silicon during fractional crystallization. Zirconium is another material which is suitable for treating the graphite crucible. If the zirconium is soaked into the graphite to the extent of about 50% by weight of the original graphite, it will serve adequately to resist the corrosive and dissolution effects of the molten silicon.

The treated graphite crucible 12 is supported by a pedestal 14, pedestal supporting shaft 16 and pedestal base 18. Pedestal base 18 is located on the bottom 20 of vacuum furnace 22. In addition to the bottom 20, the furnace 22 comprises a metal shell or casing 24, a central tubular resistance element 26, and a cover 28. The resistance element 26 consists of a cylindrical graphite pipe and thereby provides an electrical heating zone or path. The tubular resistance element 26 will also function to a limited extent as a heat radiation shield with respect to items contained within its walls.

The upper and lower ends of resistance element 26 are preferably tapered and fit into contact with metallic conducting collars 30 and 32, preferably of brass, which in turn nest within and are welded, silver soldered or brazed, to the conically spirally wound spring coils 34, 36. Spring coils 34 and 36 are constituted of tubular metal elements, the opposite ends of which extend through the cover 28 and bottom 20 of the furnace 22, as shown, and are secured as by welding, silver soldering or brazing thereto, thereby to provide a rigid support for the coils. Thus, the ends 38, 40 of the coil 34 extend through and are secured to the cover 28 while the ends 42 and 44 of the coil 36 extend through and are secured to the bottom 20 of the furnace 22.

The coils 34 and 36 preferably have sufficient resilience to permit the resistance element 26 to be releasably held between the collars 30, 32 with good electrical contact being maintained between these parts and between the collars 30, 32 and the coils 34, 36 which in turn have good electrical contact with the cover 28 and the bottom 20. The helical coils 34 and 36 not only serve as supports or spring mountings and electrical conductors for the element 26 but also preferably act as liquid coolant conductors in heat exchange relationships with the collars 30, 32 for cooling the collars 30, 32 as hereinafter described.

The cover 28 is suitably secured as by cap screws 46 to a flange portion 48 of the shell or casing 24. These cap screws are suitably insulated, as by plastic tubes 50, for example "Tygon" insulation, from the metal of the cover. A circular rubber O-ring seal 52 is provided between the cover 28 and flange 48 which is preferably provided with an O-ring groove 54 to provide a gas tight seal. "Teflon" rings may also be placed inside or outside of the O-ring seal to minimize possibilities of short circuits between cover and casing.

Suitable bus bars 56, 58 or terminals are secured as by welding, silver soldering or bolting to the cover and shell of the housing 24 to bring a high current of low voltage to the element 26. These terminals are in turn connected to the 10-volt output side of a 208 volt A.C. single phase saturable reactor and isolation transformer (not shown), the high voltage side of which is connected to a source of power.

Arranged within the shell 24 and suitably surrounding the resistance element 26 in spaced relation thereto are suitable additional radiation shields for reducing heat losses in the critical area 60. Thus, preferably there are provided two or more inner tubular shields 62, 64 of molybdenum or other suitably refractory material of low emissivity concentric with the element 26 surrounded in turn by a concentric stainless steel tubular radiation shield 66. The shields may be connected together near their bottoms by suitable tie bars 68 and secured to the bottom 20 in any suitable manner, as by bolts or screws. The outer shield may alternatively rest in a groove cut in the bottom 20 and be positioned and supported radially by the groove.

In addition to the coils 34, 36 for cooling the ends of the element 26, there are further provided a plurality of independent copper coils in heat exchange relationship with the cover 28 and shell 24 of the furnace, and which are secured to the respective parts of the housing preferably by welding or silver soldering. Thus, there is provided a spirally wound copper tube section generally designated by the numeral 70 mounted on the cover 28 of the furnace and which is connected with a source of liquid coolant such as water, a suitable control valve being provided for controlling the flow of liquid coolant.

A similar heat exchange section generally designated by the numeral 72 may be provided against the base wall 20 of the furnace.

Surrounding the shell 24 of the furnace are additional copper coil sections mounted as by welding or silver soldering to the shell of the furnace. It will thus be apparent that each section of the furnace as well as the current conducting end supports of the element 26 are provided with heat exchange devices for conducting heat away from the furnace.

The interior chamber 74 of the furnace is connected by a pipe line 76 with a vacuum pump (not shown).

Additional thermal radiation shields 78, 80, 82 are located beneath pedestal 14 to direct the heat toward crucible 12. Above the upper portion of crucible 12 and extending downwardly therein is located a shielded outlet passageway for the vapors rising from the crucible 12. As shown, this shielded outlet passageway comprises a plurality of alternately spaced doughnut-shaped treated graphite packing elements 86 and disc-shaped treated graphite packing elements 88 suspended in the manner shown by a plurality of spaced vertical studs 90 (e.g. 120° apart) also made of treated graphite material. The vapors move generally as indicated by the arrow V.

Stud members 90 are supported from the inner ends of support member 92, the outer ends of support members 92 being supported by the upper open rim of crucible 12. Additional radiation shields 94, 95 and 96 may be positioned on support members 92.

A copper tube 98 extends downwardly from top of the furnace into the passageway formed by the studs 90. The distance to which tube 98 extends downwardly into said passageway can be controlled to a desired degree by either manual or mechanical means, a height adjustment means being indicated by the numeral 100. The copper tube 98 has an inlet 102 and an outlet 104 made of plastic hose which serve to cool tube 98. Tube 98 is held within the upper capped extension 106, 108 of cover 28 by O-ring seals 110.

Upper capped extension 106 is provided with a sight glass 112 which is maintained in gas tight relationship therewith by an O-ring 114.

The process of the present invention broadly comprises the following steps:

(*a*) Introducing impure silicon into a distillation zone;

(*b*) Operating said distillation zone under reduced pressure and elevated temperatures so as to vaporize both said silicon and impurities;

(*c*) Passing said vaporized silicon and impurities to a condensation zone;

(*d*) Condensing the silicon vapor to the liquid state at a temperature where the silicon liquid has a significant vapor pressure; and (*e*) Separating the purified silicon from impurities and from the less pure silicon.

The vaporization-condensation cycle may be repeated any desired number of times depending upon the original purity of the silicon, the distillation temperature, the distillation pressure, and the final purity desired in the recovered silicon.

As noted earlier, the commercial grade of impure silicon has a purity of approximately 97%. However, silicon of nearly any purity could be utilized as the starting material. If lower purity silicon is used, a greater number of vaporization condensation stages might be needed, whereas if 97–99% purity silicon is the starting material it is possible that only one vaporization-condensation would be necessary.

More specifically, the impure silicon is first placed in crucible 12. The furnace is then sealed so that it will hold a vacuum and appropriate valves (not shown) are opened to permit the flow of coolant water through the coils covering the shell, cover and bottom of the furnace. A mechanical vacuum pump is then actuated and permitted to operate until the absolute pressure in the furnace is within the range of about 1 to 10 microns of Hg absolute. The furnace is then backfilled with pure argon to a pressure of about 1,000 to 30,000 microns of Hg absolute. Reduced pressure prevents contamination of the silicon by atmospheric air and permits the metal to vaporize rapidly at temperatures below its atmospheric boiling point. The power supply is then connected to the local power distribution feed, for example, a 208 volt, single phase alternating current system. With an appropriate system comprising a saturable core reactor, an isolation transformer, a current of 2500 amperes can be carried at voltages up to about 10 volts.

The current is now allowed to flow through the furnace at a relatively low rate until outgassing of the crucible, metal and furnace parts subsides to low rates. The outgassing is usually substantially complete by the time the furnace has reached a temperature between about 2000 and 2500° F.

Once outgassing has been completed as evidenced by a steady reduced pressure, additional power is applied to the furnace by increasing the direct voltage until the silicon metal vaporizes. At about 10 volts A.C., for example, the furnace crucible 12 will reach a temperature of about 3500 to 4500° F. and more, and the temperature of the metal in the bottom of the crucible may be slightly less, depending upon how well heat losses are controlled.

As the impure silicon metal in the crucible vaporizes, it rises upwardly as indicated by the arrowed line V through the disc and doughnut type packing elements 86, 88. After these vapors rise above the packing elements 86, 88, they next encounter a condensing surface comprising cooled copper tube 98. Essentially pure silicon metal will collect on copper tube 98, if the temperature of the copper tube is maintained within a sufficiently narrow range that vaporized impurities are not also condensed. Stated in other words, it is desirable to maintain the temperature of condensing surface 98 at or below the condensation temperature for the silicon metal but above the condensation temperature for the impurities. Material more volatile than silicon can thus be vented from the apparatus while the less volatile material could remain in the reboiler. The operation can be carried out in either a batch-wise or continuous fashion, as desired.

Although the drawing shows only a one-stage distillation unit, multi-stage distillation units can obviously be employed. Multi-stage distillation units are particularly desirable when a very low purity silicon metal is used as the starting material. Multi-stage distillation units are also desirable when one wishes to obtain silicon product material with varying degrees of purity. Also, whereas the drawing shows only a single condenser or condensing stage, it will be understood that a plurality of successive contiguous cycles of condensation and re-vaporization, as is conventional in fractional distillation systems, could be employed, either within a single distillation stage or within a plurality of distillation stages.

The materials more volatile than silicon will be removed in the vacuum system. Such materials usually include the oxygen compounds of silicon, such as silicon monoxide. Other miscellaneous impurities, such as trapped or occluded atmospheric gases, or water, or hydrogen, are also removed in the vacuum system during such a distillation process. A substantial portion of the impurities in commercial silicon is iron. Iron impurities along with other impurities less volatile than silicon remain in the distillation system since they are less volatile than silicon.

The following example will specifically illustrate the present invention utilizing the procedure and apparatus described above:

*Example 1*

Commercial grade silicon of 97% purity was placed in a crucible consisting of graphite treated with 35% by weight of titanium carbide to render the graphite crucible diffusion resistant. The crucible was positioned within a furnace of the type shown in the drawing and a vacuum of about one micron mercury absolute applied, followed by backfilling to about 20,000 Hg absolute with pure argon, in conjunction with a temperature of about 4100° F. Silicon of 99.99% purity was separated by condensation and recovered.

In conclusion, while there has been illustrated and described some preferred embodiments of this invention, it is to be understood that since the various details of construction and procedural steps may obviously be varied without departing from the basic principles and teachings of this invention, we do not intend to limit ourselves to the precise constructions herein disclosed and the right is specifically reserved to encompass all changes and modifications coming within the scope of the invention as defined by the appended claims.

Having thus described our invention, we claim:

1. A process for purifying impure silicon metal comprising vaporizing impure silicon at a pressure between about 1000 and 30,000 microns of mercury absolute at a temperature within the range of about 3500 to 4500° F. to form a vapor containing silicon and impurities more volatile than silicon, cooling the vapor to a temperature to condense the silicon and above the condensation temperature for the impurities, and recovering purified silicon.

2. A process for purifying impure silicon metal comprising placing impure silicon to be purified in a distillation zone, reducing the pressure in said zone to a pressure of about 1 to 10 microns of mercury absolute, supplying argon to said zone and maintaining the pressure in said zone between about 1000 to 30,000 microns of mercury absolute, outgassing said zone with argon concurrently with heating said zone to a temperature of about 2000 to 2500° F., further heating said zone to a temperature of about 3500 to 4500° F. so as to vaporize said silicon, contacting the resulting vapor with a condensing surface at a temperature to condense the silicon and above the condensation temperature for the impurities, and recovering purified silicon from said surface.

References Cited in the file of this patent

UNITED STATES PATENTS

| | | |
|---|---|---|
| 2,901,325 | Theuerer | Aug. 25, 1959 |
| 2,992,080 | Herrick | July 11, 1961 |

OTHER REFERENCES

Mellor: A Comprehensive Treatise on Inorganic and Theoretical Chemistry, vol. 6, 1925 Ed., page 155, Longmans, Green & Co., N.Y.

McPherson and Henderson, A Course in General Chemistry, 3rd Ed., 1927, pages 208 and 209, Ginn and Co., N.Y.

"High Purity Silicon," by Felix B. Litton et al., J. Electrochem. Society, June 1954, pages 287–292.